United States Patent
Louvau et al.

(10) Patent No.: US 9,189,517 B2
(45) Date of Patent: Nov. 17, 2015

(54) INTEGRATING SEARCH WITH APPLICATION ANALYSIS

(71) Applicant: Microsoft Corporation, Redmond, WA (US)

(72) Inventors: Scott M. Louvau, Redmond, WA (US); Michael C. Fanning, Redmond, WA (US); Christopher M. Faucon, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/044,658

(22) Filed: Oct. 2, 2013

(65) Prior Publication Data

US 2015/0095885 A1 Apr. 2, 2015

(51) Int. Cl.
*G06F 17/30* (2006.01)
*G06F 9/44* (2006.01)

(52) U.S. Cl.
CPC ............ *G06F 17/30424* (2013.01); *G06F 8/75* (2013.01); *G06F 8/20* (2013.01); *G06F 8/36* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 6,052,121 A | 4/2000 | Webster et al. | |
| 6,990,238 B1 | 1/2006 | Saffer et al. | |
| 7,386,831 B2 | 6/2008 | Flanagan | |
| 7,596,778 B2 | 9/2009 | Kolawa et al. | |
| 7,860,891 B2 | 12/2010 | Adler et al. | |
| 7,904,802 B1 | 3/2011 | Kolawa et al. | |
| 7,966,301 B2 | 6/2011 | Toyama et al. | |
| 8,024,322 B2 * | 9/2011 | Loofbourrow et al. | 707/713 |
| 8,082,258 B2 * | 12/2011 | Kumar et al. | 707/742 |
| 8,190,992 B2 | 5/2012 | Tien et al. | |
| 8,229,730 B2 | 7/2012 | Van Den Berg et al. | |
| 8,307,351 B2 * | 11/2012 | Weigert | 717/141 |
| 8,418,147 B1 * | 4/2013 | Odenwelder et al. | 717/128 |
| 2004/0085354 A1 | 5/2004 | Massand | |
| 2007/0283338 A1 * | 12/2007 | Gupta et al. | 717/154 |
| 2008/0071602 A1 | 3/2008 | Ojakaar et al. | |
| 2011/0202541 A1 * | 8/2011 | Permandla et al. | 707/742 |
| 2012/0245924 A1 | 9/2012 | Brun | |
| 2013/0013996 A1 | 1/2013 | Wu | |
| 2014/0282421 A1 * | 9/2014 | Jubran et al. | 717/126 |

OTHER PUBLICATIONS

Ulrich Bayer, Andreas Moser, Christopher Kruegel, Engin Krida. Dynamic analysis of malicious code [online], 2006, [retrieved on Nov. 10, 2014] retrieved from internet. <http://www.cs.uscb.edu/~chris/research/doc/virology06_dynamic.pdf>.*

(Continued)

Primary Examiner — Don Wong
Assistant Examiner — Shirin Alizadeh
(74) Attorney, Agent, or Firm — Kevin Sullivan; Kate Drakos; Micky Minhas (57) ABSTRACT

Aspects of the subject matter described herein relate to searching. In aspects, a software package may be received and transformed into searchable data. Static and dynamic analysis may be performed on code and data included in the software package. A data structure is created that may index the code, metadata, indexable resources, and analysis artifacts associated with the software package. The data structure may be used to satisfy queries and the transformed data and analysis artifacts may be made available for viewing.

20 Claims, 7 Drawing Sheets

(56) References Cited

OTHER PUBLICATIONS

Richard E.Fairley, Colorado State University. Tutorial: Static Analysis and Dynamic Testing of Computer Software [online], 1978, [retrieved on Nov. 10, 2014] retrieved from internet. <www.computer.org/csdl/mags/co/1978/01646907.pdf.*

Ray Ontko, Department of Computer Science, Earlham College. Annotations in Computer Science. 1997. [online], [retrieved on Nov. 11, 2014] retrieved from internet. <www.ontko.com/pub/rayo/annotation.html>.*

Witte, et al., "Text Mining and Software Engineering: an Integrated Source Code and Document Analysis Approach", Retrieved at <<http:ieeexplore.ieee.org/stamp/stamp.jsp?tp=& arnumber=4460890>>, in IET Software, vol. 2, Issue 1, Feb. 2008, 14 pages.

Eick, Stephen G., "Visualizing Multi-Dimensional Data", Retrieved at <<http://herakles.zcu.cz/seminars/docs/infovis/papers/Eick_advizor_99.pdf>>, In Newsletter of ACM SIGGRAPH Computer Graphic, vol. 34, Issue 1, Feb. 2000, 7 pages.

Wu, et al., "FastBit: Interactively Searching Massive Data", Retrieved at <<http://crd-legacy.lbl.gov/~kewu/ps/LBNL-2164E.pdf>>, In the Journal of Physics: Conference Series, vol. 180, Issue 1, Jun. 2009, 12 pages.

U.S. Appl. No. 13/909,079, filed Jun. 4, 2013, 54 pages.

\* cited by examiner

SEARCH: V:LATEST INSTALLCOUNT:100K JS2001  — 300 / 305 / 315

APPLICATION 1 - VERSION – RATING
  CODE ELEMENT 1
  CODE ELEMENT 2
  CODE ELEMENT M
  RESOURCE 1
  RESOURCE 2
  RESOURCE N
  METADATA ELEMENT 1
  METADATA ELEMENT 2
  METADATA ELEMENT P

APPLICATION 2 - VERSION - RATING

...

APPLICATION N - VERSION - RATING

INTEGRATING SEARCH WITH APPLICATION ANALYSIS

BACKGROUND

In developing software, a software developer may have access to an integrated development environment (IDE). The IDE may allow the software developer to browse and edit files that are part of a software project. The IDE may also allow the software developer to search the code of the software project to find lines of code that match a given string. Unfortunately, searching the code to find matching strings may be of limited usefulness in finding problems, seeing trends, and producing better software.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to searching. In aspects, a software package may be received and transformed into searchable data. Static and dynamic analysis may be performed on code and data included in the software package. A data structure is created that may index the code, metadata, indexable resources, and analysis artifacts associated with the software package. The data structure may be used to satisfy queries and the transformed data and analysis artifacts may be made available for viewing.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
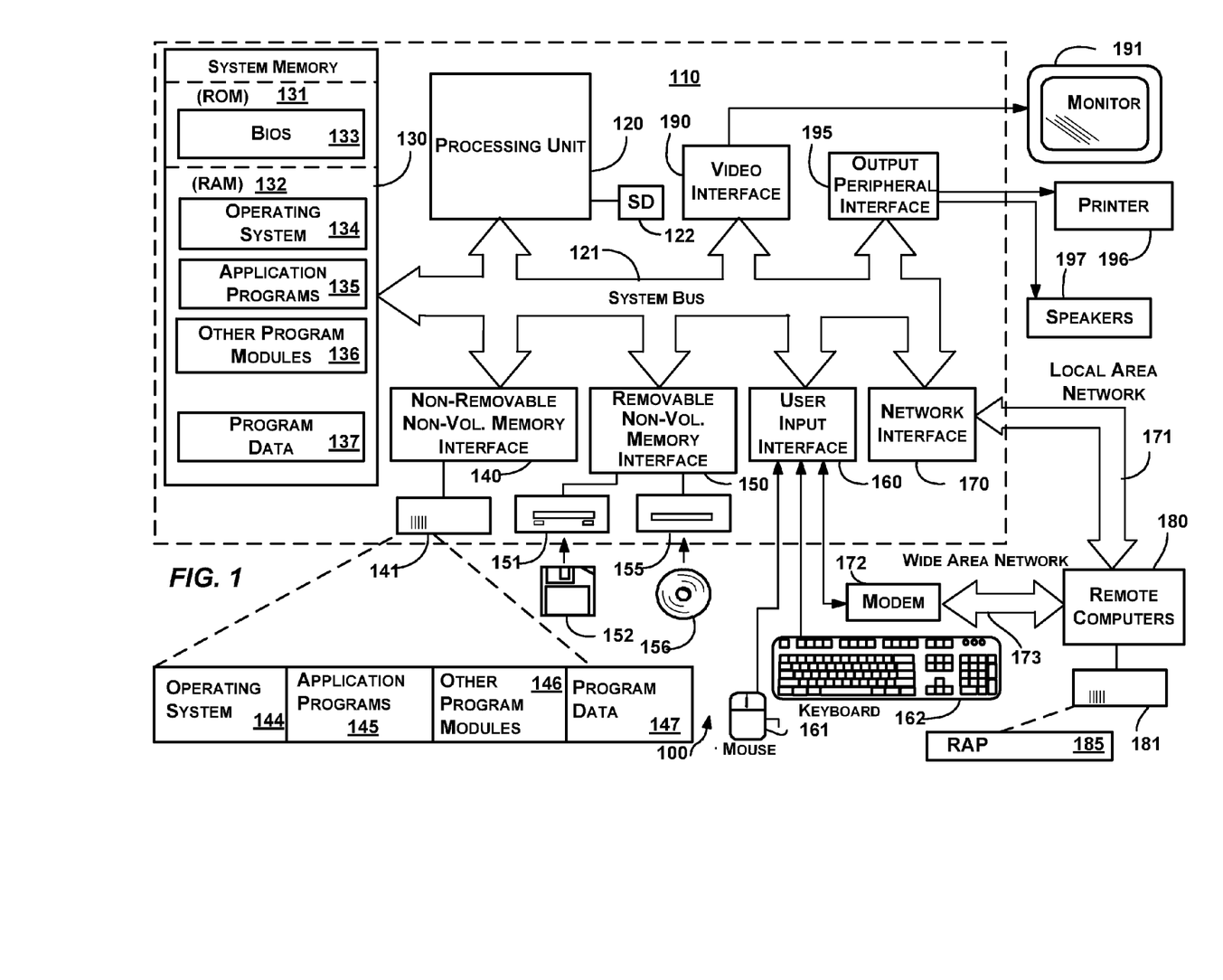
FIG. 1 is a block diagram representing an exemplary computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172, network card, or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Searching

Figure 2:
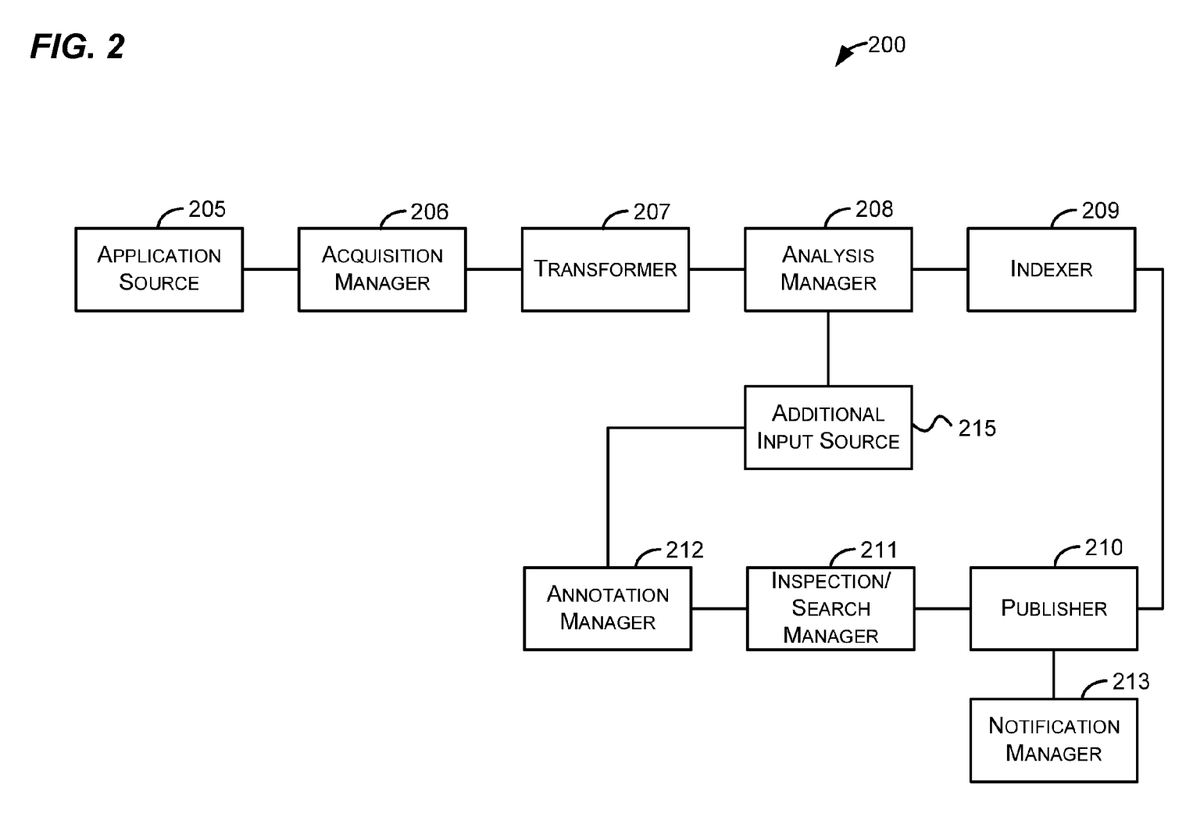
FIG. 2 is a block diagram that generally represents exemplary components of a system configured in accordance with aspects of the subject matter described herein.

As mentioned previously, searching code to find lines that match a given string may be of limited usefulness. FIG. 2 is a block diagram that generally represents exemplary components of a system configured in accordance with aspects of the subject matter described herein. The components illustrated in FIG. 2 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

As used herein, the term component is to be read to include hardware such as all or a portion of a device, a collection of one or more software modules or portions thereof, some combination of one or more software modules or portions thereof and one or more devices or portions thereof, or the like. In one implementation, a component may be implemented by configuring (e.g., programming) a processor (e.g., the processing unit 120 of FIG. 1) to perform one or more actions.

For example, the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIG. 2 comprises the computer 110 of FIG. 1.

A component may also include or be represented by code. Code includes instructions that indicate actions a computer is to take. Code may also include data, variables, definitions, relationships, associations, and the like that include information other than actions the computer is to take.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program state, program data, other data, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like. A service is another name for a process that may be executed on one or more computers.

Furthermore, as used herein, the term "service" may be implemented by one or more physical or virtual entities, one or more processes executing on one or more physical or virtual entities, and the like. Thus, a service may include an actual physical node upon which one or more processes execute, a virtual node upon which one or more processes execute, a group of nodes that work together, and the like. A service may include one or more processes executing on one or more physical or virtual entities. Furthermore, a single process may implement one or more services.

For simplicity in explanation, some of the actions described below are described in a certain sequence. There is no intention, however, to limit the subject matter described herein to the particular sequence. Indeed, in various implementations, the actions described herein may be ordered in different ways and may proceed in parallel with each other.

Turning to FIG. 2, the system 200 may include an application source 205, an acquisition manager 206, a transformer 207, an analysis manager 208, an indexer 209, a publisher 210, an inspection/search manager 211, an annotation manager 212, a notification manager 213, an additional input source 215, and other components (not shown). In some implementations, there may be more than one of each of the components listed above.

The application source 205 may include any entity capable of providing a software package. In some implementations, an application source 205 may also provide metadata, if any, associated with the software package. In one implementation, a software package includes everything that is installed with a software application. A software package may include and/or be associated with code, resource, and metadata. Code has been described previously.

Metadata includes data about the software package. Metadata may include, for example, a version, author, creation date, release data, or other data, size, names of elements of the software package, dependencies, capabilities required of the platform on which the software package is to be installed, a number of times the software package has been downloaded, installed, or executed or other usage statistics associated with the software package, how highly rated the software package is, other data about the software package, and the like.

Some metadata may be included in the software package. Other metadata may be associated with the software package. For example, in one implementation, version, author, data, size, names of elements of the software package, dependencies, capabilities, and the like may be included in the software package while ratings, download, installation, execution, other usage statistics, sales price and other sales data, and other metadata may be maintained outside of the software package. The metadata included inside a software package and the metadata maintained outside of the software package may vary from implementation to implementation.

Resources include anything in a software package that is not code or metadata. Resources may include, for example, bitmaps, thumbnails and other graphics, audio data, video data, other presentation data, a manifest, documentation, help files, and the like. A manifest may describe entry points and other points of interoperation between a run time environment and the application when the application executes.

A software package may include one or more sub packages. Each sub package may include one or more other sub packages and so forth. The number of allowable levels of nesting of sub packages may be limited explicitly (e.g. by a configurable parameter, language grammar, schema, or the like) or limited implicitly (e.g., subject to package size limitations, if any). Each sub package may include code, metadata, and/or resources as well as one or more sub packages.

The application source 205 may include a plurality of software packages. For example, in one implementation, the application source 205 may comprise a Web store that hosts a variety of software packages available for download to customers. Each application included in the application source 205 may be identified by one or more identifiers that distinguish the application from other applications and from other versions of the application.

The acquisition manager 206 may obtain application packages and associated metadata from the application source 205 at various times. In one implementation, acquisition may occur at regular intervals. For example in one implementation, at 24 hour intervals, the acquisition manager 206 may obtain all new application packages from the application source 205. In this implementation, at 24 hour, 7 day, or some other intervals, the acquisition manager 206 may also obtain all new revisions of existing applications. The numbers above are exemplary only and may be different in other implementations. The frequency of acquisition and what is acquired with each acquisition may be configurable or hardcoded without departing from the spirit or scope of aspects of the subject matter described herein.

After receiving one or more packages, the transformer 207 may be called to transform the packages. Transforming may include, for example, extracting code, resources, and metadata from the software package and storing the code, resources, and metadata on a hard disk, memory, or other storage medium.

Code in a software package may be encoded in source code, intermediate language, assembly language, binary code, some combination of the above, and the like. Transforming may include decompiling code of a package to obtain decompiled code.

Transforming may also include making the elements of the software package more human-readable. For example, code in a software package may be syntactically correct and easily readable by a computer, but the same code may be difficult for a human to read. The transformer 207 may reformat code to have formatting (e.g., margins, tabs, other formatting conventions, and the like) that is easier for a human to interact with. The transformer 207 may take phrases that are encoded in binary or some other encoding in the software package and transform these phrases into human-readable language which may then be indexed.

The transformer 207 may extract a sub package found within a package or sub package and may perform any transformation activities described herein on the extracted sub package. In addition, in extracting a sub package, the transformer 207 may maintain hierarchical information that may be used to show a hierarchical view. For example, if a sub package includes code, the code may be shown in a hierarchical view with respect to the code or other elements of its parent package. The hierarchical information may be provided to a viewing tool that allows a user to view nested content in a package like a code inspecting utility of an IDE, for example.

The analysis manager 208 may execute one or more analysis tasks to obtain analysis data (sometimes referred to as analysis artifacts or documents) regarding the software package. Analysis tasks may include static and dynamic analysis tasks. Static analysis tasks may include tasks that are performed without executing code of the software package while dynamic analysis tasks may include tasks that are performed while executing code of the software package.

Some exemplary static analysis tasks include:

1. Searching code for coding practices that violate certain security precautions (e.g., generating and executing new code via an evaluation function).

2. Searching code for styling practices that violate specified styling guidelines.

3. Extracting links to Websites included in code and determining whether the links reference Websites that are indicated as safe.

4. Extracting strings from binaries, resource streams, etc., and determining whether the strings refer to dangerous/vulnerable APIs, comprise potentially offensive or adult content, represent personally identifiable information such as addresses, social security numbers, credit card details, logon information or account/password credentials, or the like.

5. Extracting graphical content and determining whether that content comprises potentially offensive or adult content, contains personally identifiable information such as embedded geolocation (GPS) information, or the like.

6. Inspecting constituent files of a software package in order to identify their file type and/or perform other binary-level analysis (such as verifying that code files have been compiled with secure compilation tools).

7. Constructing a graph of application code dependencies, which may be based on computing a hash of a file or binary in order to associate it with a global store of information related to shared files.

Some exemplary dynamic analysis tasks include:

1. Taking screen shots of the application as it executes;

2. Installing and executing the code in an instrumented environment in order to collect profiling/code coverage data, generally monitor execution behavior, etc. Runtime behaviors that are collected/recorded may include a) reads/writes to the registry, file system, and/or other persistent stores; b) use of specific OS API (including collection of API argument values or other observed runtime state), c) Access of off-machine resources via the network, including URLs referenced in HTTP requests, relevant responses, network packets, etc., d) alteration of permissions, access controls lists, or related security settings as applied to files, security groups, etc.

3. Capturing and persisted 'unpacked' and/or dynamically generated code, e.g., as produced by the use of the JavaScript 'eval' function or its functional equivalents, the dynamic generation and execution of managed assemblies via the CLR .NET Codedom model, etc.

4. Enabling and capturing arbitrary runtime tracing, logging, and event output supported by the runtime environment.

5. Generating snapshots of system state before, during, and after installation and/or execution of code, in order to produce a delta of altered machine/environment state.

The analysis manager 208 may request analysis from an analyzer that takes some extended time to perform the analysis. Rather than wait for the analysis to be performed before performing other tasks, the analysis manager 208 may do other things (e.g., have other analysis performed) and may obtain analysis results at a later time. After obtaining the analysis results, metadata may be updated as appropriate. This process above is sometimes referred to as asynchronous analysis.

The analysis manager 208 may receive additional data regarding an application from the additional input source 215. The additional input source 215 may supply metadata that is not included in the software package. For example, in some implementations, sales data, use data, customer comments, and other data may be provided by the additional input source 215.

The indexer 209 receives the output of the analysis manager 208 and also has access to the extracted application package as transformed by the transformer 207. The indexer 209 may then index the code, metadata, analysis data, and any indexable resources into a data structure that associates terms found with respective locations at which the terms are found.

In one implementation, indexed data may be stored in an inverted index data structure. In an inverted index data structure, each search term is associated with one or more documents that include the search term or that are associated with metadata that includes the search term. For example, the table below shows an exemplary inverted word index that includes some terms and associated location identifiers.

| Term | Location Identifiers |
| --- | --- |
| app: javascript | 1, 3, 7, 15, . . . |
| jQuery | 2, 7, 36, 39, . . . |
| Dojo | 7, 15, 23, 31, . . . |
| JS2001 | 8, 15, 17, 54, . . . |
| . . . | . . . |

Location identifiers may specify a document and a location within the document at which the term was found. The term "document" may be used to refer to metadata, a resource, code of a software package, or the like. The inverted index data structure above may include a term for each different term that is searchable for a given set of documents. For example, there may be N terms extracted from the contents of documents and M metadata terms associated with the documents. In this example, the inverted index data structure may include N+M entries where each entry is associated with its own set of location identifiers.

In other implementations, index data may be stored in other data structures. Some exemplary data structures include a relational database, an object-oriented database, a hierarchical database, a network database, other types of databases, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. In one implementation, these files may be linked to global representations/data shared across packages. Index data may be stored in local storage, cloud storage, or a combination thereof.

The publisher 210 may output updated index data in a form suitable for the inspection/search manager 211. For example, the publisher 210 may output the updated index data so that the data is available programmatically or via a web service, for example. The publisher 210 may also inform the notification manager 213 that updated index data is available.

The publisher 210 may also output data to other data repositories (e.g., databases or the like) as part of its publishing.

In one implementation, the notification manager 213 may send a message that indicates that results are available for a received software package. For example, in one implementation, the application source 205 may include a browser with which a user interacts to upload elements of a software package to a service that performs the actions of one or more of the components of the system 200. In this implementation, after the indexer 209 has completed its work, the notification manager 213 may notify the user so that the user may then begin searching the results.

The notification manager 213 may also send messages to registered consumers. For example, in registering with the notification manager 213, a consumer may provide a query to the notification manager 213. Thereafter, the notification manager 213 may notify the consumer when new updates that satisfy the query are published by the publisher 210. In one implementation, a notification manager 213 may be implemented as a Really Simple Syndication (RSS) or similar feed that updates when a new application is indexed that matches a given search query.

The annotation manager 212 provides a mechanism by which annotations may be fed back to be indexed. During search and inspecting an application, a user or automated process may comment on or flag content available through the inspection/search manager 211. For a user, annotation may be enabled by giving the user the ability to annotate content in browser or other viewing program during inspection. For an annotating process, an API may be provided that allows the annotating process to programmatically annotate content. Annotations may then be provided to the additional input source 215 which may format or otherwise process the annotations as desired.

The additional input source 215 may include one or more data sources other than the application source 205. For example, an additional input source may include additional metadata for a software package that is not included in the software package. Some exemplary metadata that may be maintained outside of a software package include, for example, software rating, download patterns, installation statistics, execution data, other metadata mentioned herein, and the like. In one implementation, virtually any data maintained about a software package that is not included in the software package may be entered into the system via the additional input source 215.

In receiving data from the additional input source 215, the analysis manager 208 may perform additional analysis on the data and/or provide the data as is to the indexer 209 for indexing.

The inspection/search manager 211 allows a user to search and inspect data regarding one or more software packages. For example, the inspection/search manager 211 may allow a user to view any of the files generated by the system 200 in processing a software package. For example, decompiled code may be viewed via the inspection/search manager 211 in a user-friendly and readable format. As another example, images included in the software packages may be viewed via an image view. As another example, reports or other analysis data, if any, generated during analysis may be viewed via the inspection/search manager 211. As yet another example, metadata about the software package may be viewed via the inspection/search manager 211. As yet another example, video, music, and other media files extracted from the software package may be played via the inspection/search manager 211.

The inspection/search manager 211 may perform additional actions in response to user interaction. For example, if the user hovers over a URL extracted from a software package, the inspection/search manager 211 may cause a URL check to be performed (e.g., via a service, database, heuristics, or the like) that indicates whether the URL is considered "safe". The inspection/search manager 211 may then indicate to the user whether the URL is considered "safe" through some user interface element. For example, the inspection/search manager 211 may display whether the URL is "safe" and perhaps safeness data associated with the URL in a tooltip. "Safeness" may also be determined prior to any user interaction and displayed when the user selects the appropriate analysis data.

In one implementation, the inspection/search manager 211 may be implemented as a Web service that allows a user to browse indexed content and search on the indexed content without requiring installation of additional browsing/inspecting programs.

The interface displayed to a user may include a search box. In one implementation, as the user types in the search box, applications that meet the typed-in search criteria may be displayed. In one implementation, each keystroke entered may be used as soon as it is entered to find data satisfying the terms or partial terms entered—even if a complete query has not been entered. The input entered by the user may also be used to create a completion list of likely terms that the user may select from to complete a query.

In an implementation, searches may be conducted over one or more versions of software packages. For example, index data and extracted data may be maintained for multiple versions of software packages. When a user issues a query, version of software packages that satisfy the query may be returned. The option to limit a search a particular version or versions may be indicated by using a given term (e.g., v:latest, v:first, v:range, or the like) in the query.

In an implementation, an implicit qualifier may be used to limit a user to items that user is authorized to see. There may also be limits placed on visualizations of files within a package, annotations, or any other data included in a package.

In another implementation, the inspection/search manager 211 may be implemented as a file share that allows a user to view and search content with whatever search tools and text editing tools the user has available.

Figure 3:
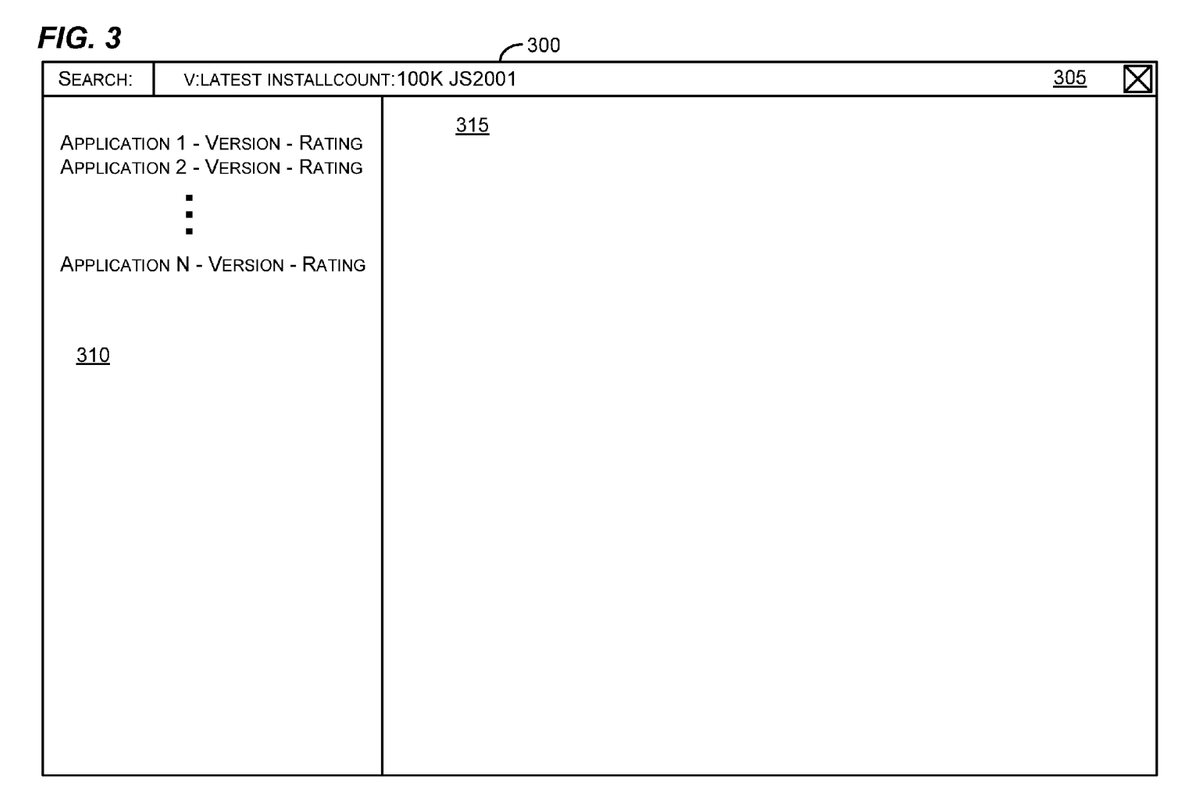
FIGS. 3-4 represent exemplary user interfaces in accordance with aspects of the subject matter described herein.

FIG. 3 represents an exemplary user interface in accordance with aspects of the subject matter described herein. The user interface 300 may include a search area 305, a search result pane 310, an application pane 315, and/or other user interface elements (not shown).

In describing aspects of the subject matter herein, a query term may be shown as including a qualifier followed by a ":". In one implementation, when a query term includes a qualified followed by a ":", the query may be interpreted to be a query that involves metadata of documents. In another implementation, when a query includes a qualifier followed by a ":", the query may be interpreted to be a query that restricts searching of the term to specific types of data (e.g., code, metadata, resources, reports, annotations, or any other data included in, derived from, or associated with one or more software packages). For example, a query starting with "f:" may instruct a search engine to restrict searching to code documents with certain file names. If the query term does not include a ":", the query may be interpreted to be a query that is not restricted to a specified type of data included in, derived from, or associated with one or more software packages.

For example, the term "app:javascript" may be used to instruct a search engine to search for applications that have been indicated (e.g., via metadata) as including an HTML/JavaScript entry point. As another example, the term "has:javascript" may be used to instruct a search engine to search for applications that have been indicated (e.g., via metadata) to include one or more Web language files. Likewise, the terms "cat:games" and "cat:tools" may be used to instruct a search engine to search for applications that have been classified in the categories of games and tools, respectively. A document is not restricted to being associated with a single metadata search term. For example, a document that is associated with "cat:games" may also be associated with "cat:education".

On the other hand, terms such as "jQuery" and "Dojo" do not include a ":" and may be used to instruct a search engine to search for documents that include terms that match these terms.

A user may use qualifiers to limit a search to analysis reports, annotations, or any other data included in, derived from, or associated with one or more software packages.

The mechanism described above for qualifying a search term by using a prefix is exemplary only. In other implementations, other mechanisms may be used for explicitly or implicitly indicating what data is to be searched for a term without departing from the spirit or scope of aspects of the subject matter described herein.

In the search area 305, the terms "v:latest", "installcount: 100K", and JS2001 have been entered in the search area 305. The term "v:latest" indicates that the search be limited to the latest versions of available applications. The term "installcount:100K" indicates that the search be limited to applications that have been installed at least 100,000 times and less than another number (e.g., 1,000,000). The term "JS2001" indicates that the search be limited to applications that have a certain problem with the coding (e.g., a problem identified by analysis). The search result pane 310 shows applications that satisfy the requirements above.

After selecting an application from the pane 310, an expansion may occur that lists elements of the application as well as results obtained from analysis and other metadata about the application. Where a query includes a search term that is found in content of the application, highlighting of elements that include the search term may indicate that the term is found in that content.

Figure 4:
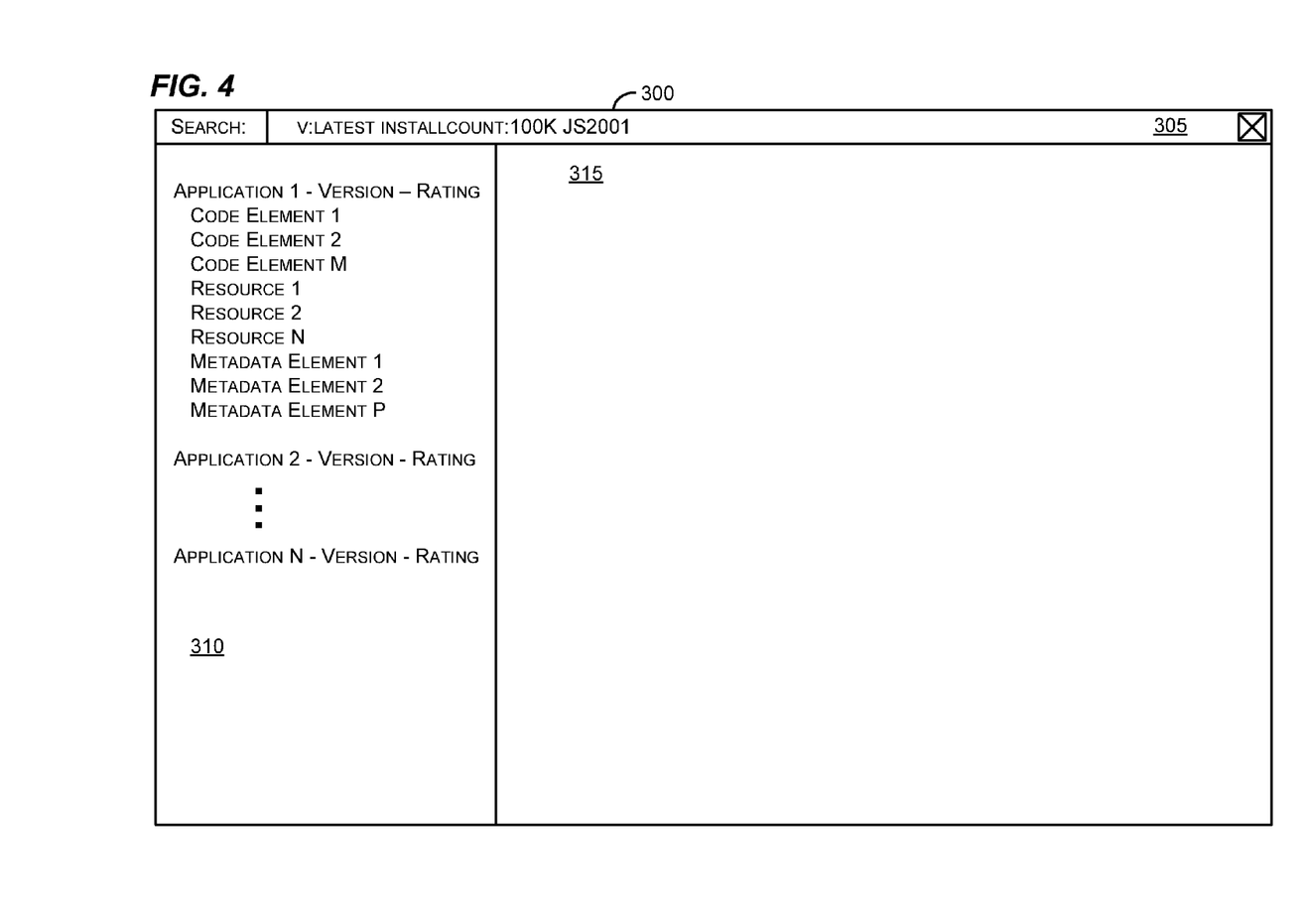

For example, referring to FIG. 4, the application 1 has been expanded into code elements 1-M, resources 1-N, and metadata elements 1-P. A user may browse the code elements, resources, and metadata associated with the application by selecting items from the expansion. In one exemplary implementation, a user may browse to code elements (e.g., functions, procedures, files, or the like) associated with a program, to a page that shows a sales screen (e.g., the screen in which the application is offered for download or sale), to a page that shows URLs included in the application, to a page that shows screen snapshots taken while the application is executing, and to one or more pages showing other metadata.

Describing the pages above is exemplary only and is not intended to limit the output to the pages or data described. Indeed, based on the teachings herein, those skilled in the art will recognize many other output pages that may be provided without departing from the spirit or scope of aspects of the subject matter described herein. For example, applications shown in the application pane 315 may be expanded to show application files that may be edited by a text editor that implements editor features such as colorization, scrollbars, code annotations, and the like.

When text is displayed in the pane 315, a search box or other user interface element (not shown) may allow input of one or more key words to be used in searching results of a previous query. This may be useful, for example, to find phrases within the text displayed in the pane 315.

The user interface 300 may allow a user to encode a query into a link. The user may then send the link to others so that they may issue the query to obtain search results.

The user interface 300 may also allow a user to subscribe to an RSS or other feed.

The user interface 300 may also allow a user to obtain a list of software packages that match a query so that the user may subsequently inspect the software packages.

The pane 315 may be used by a user or automated process to annotate content that can also be indexed as described previously. In another implementation, annotations may be made programmatically via an API as described previously.

Figure 5:
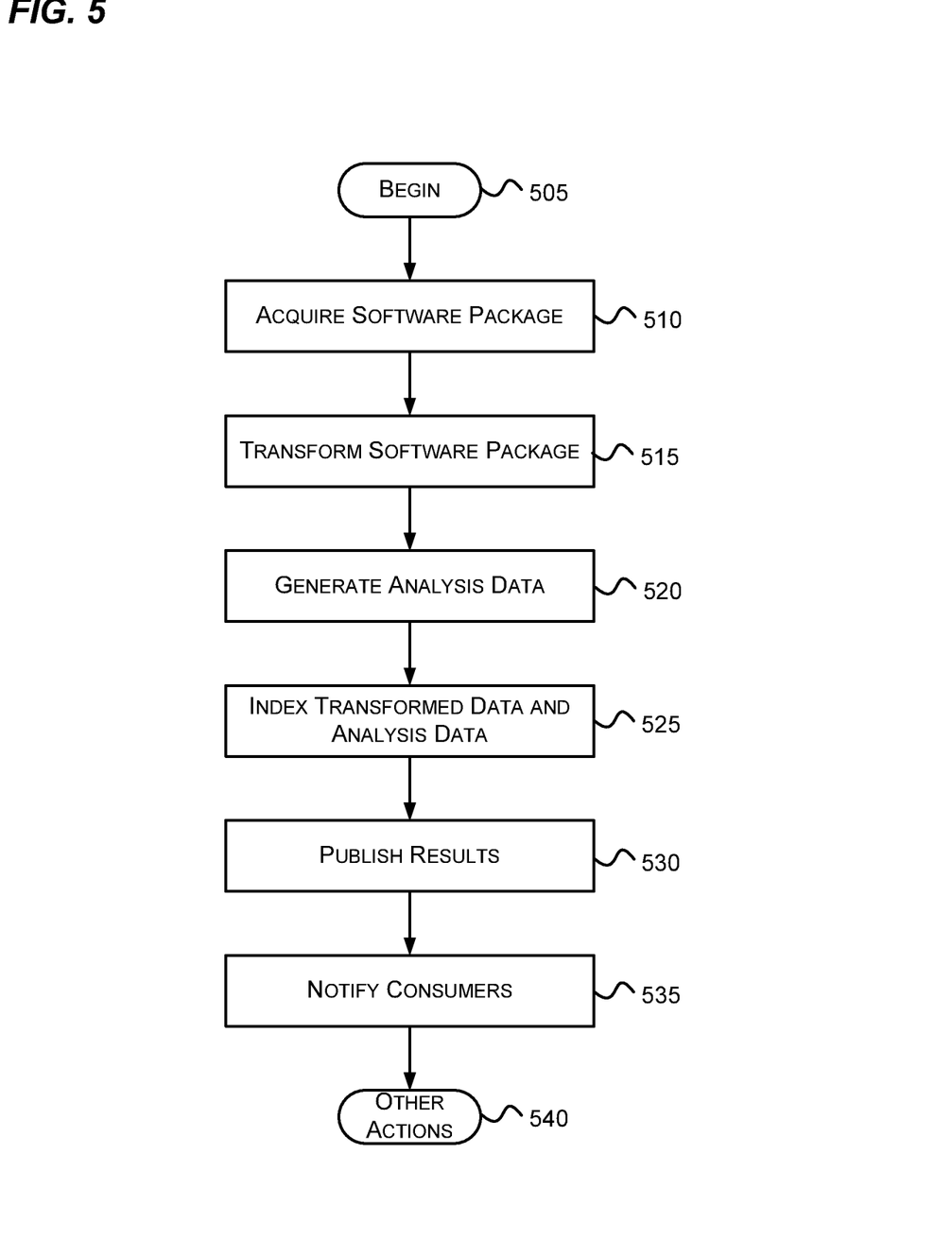
FIGS. 5-7 are flow diagrams that generally represent exemplary actions that may occur in accordance with aspects of the subject matter described herein.
Figure 6:
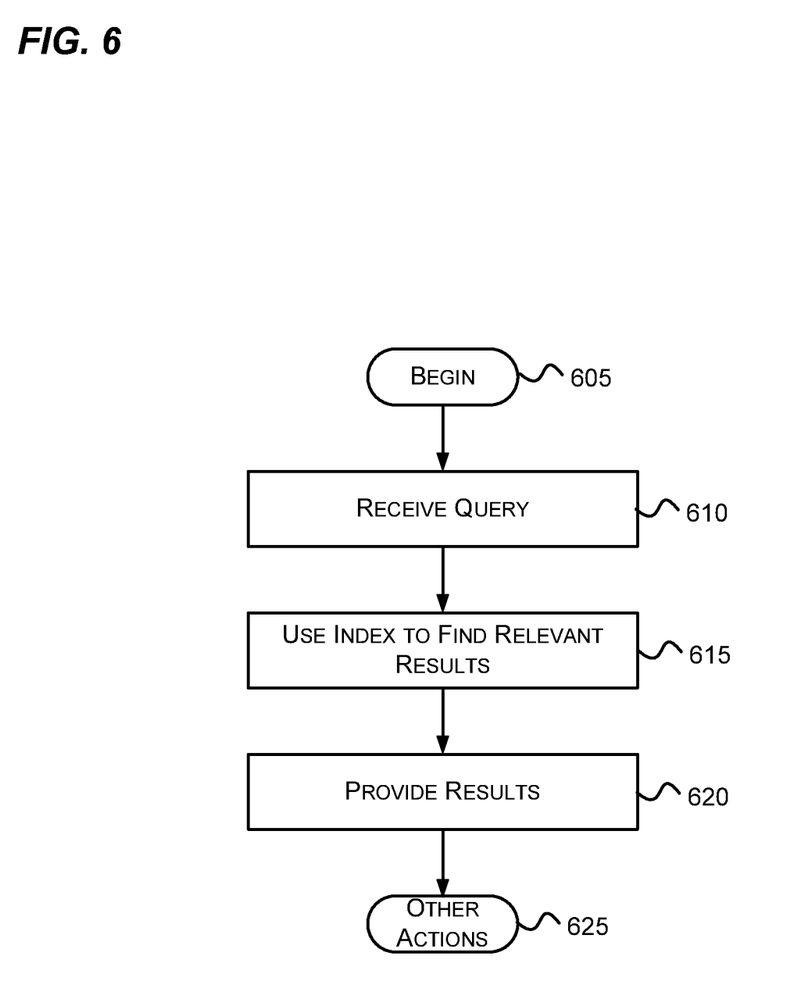
Figure 7:
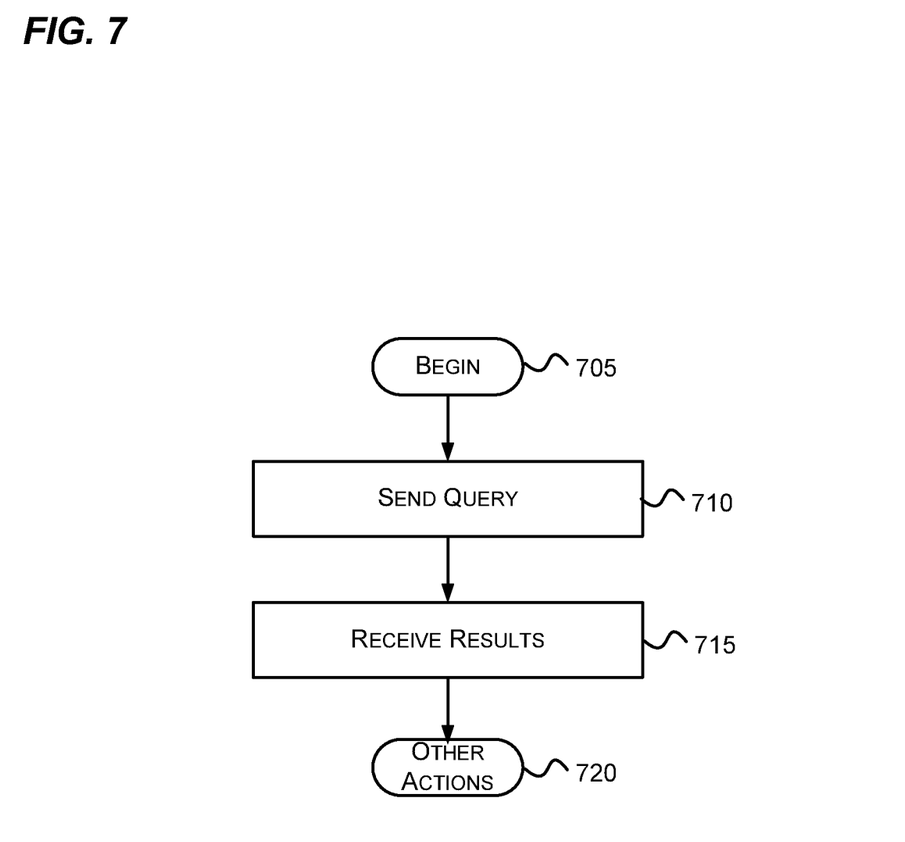

FIGS. 5-7 are flow diagrams that generally represent exemplary actions that may occur in accordance with aspects of the subject matter described herein. For simplicity of explanation, the methodology described in conjunction with FIGS. 5-7 is depicted and described as a series of acts. It is to be understood and appreciated that aspects of the subject matter described herein are not limited by the acts illustrated and/or by the order of acts. In one embodiment, the acts occur in an order as described below. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 5, at block 505, the actions begin. At block 510, a software package is acquired. For example, referring to FIG. 2, the acquisition manager 206 may receive a software package from the application source 205.

At block 515, the software package is transformed. For example, referring to FIG. 2, the transformer 207 may receive the software package from the acquisition manager 206 and may extract code, metadata, and resources from the application package.

At block 520, analysis data may be generated based on an analysis of at least a portion of the software package. For example, referring to FIG. 2, the analysis manager 208 may execute an analysis task that extracts links to Websites included in code of the software package and determine whether the links reference Websites that are indicated as safe.

At block 525, a data structure is created or updated that associates terms obtained from the software package and from the analysis data with location information that indicates where the terms were obtained. In one implementation, the data structure that is created or updated is an inverted index data structure as described previously. For example, referring to FIG. 2, the indexer 209 may create or update a data structure from the terms included in the software package and any analysis documents generated therefrom. Terms may be found in code, metadata, resources, and the like.

At block 530, publishing occurs. For example, referring to FIG. 2, the publisher 210 may output the index data so that the data is available programmatically or via a web service, for example. The publisher 210 may also inform the notification manager 213 that updated index data is available. The publisher 210 may also output data to other data repositories as part of its publishing.

At block 535, consumers may be notified that data is available. For example referring to FIG. 2, the notification manager 213 may send messages to consumers (e.g., those who have registered or otherwise expressed an interest in results) that indicate that results are available for a received software package.

At block 540, other actions, if any, may be performed. The actions described in conjunction with FIG. 5 may be repeated as many times as needed to process additional software packages.

Turning to FIG. 6, at block 605, the actions begin. At block 610, a query is received. For example, referring to FIGS. 2 and 3, the query "v:latest installcount:100K JS2001" is received by the inspection/search manager 211. As mentioned previously, in one implementation, as the query is typed, software packages that satisfy the partially completed query are displayed in the pane 310 of FIG. 2.

At block 615, a data structure is used to find results relevant to a received query. For example, referring to FIGS. 2 and 3, an inverted index data structure (not shown) previously generated by the indexer 209 is used to find the applications shown in pane 310.

At block 620, results are provided. For example, referring to FIG. 3, the list of applications shown in pane 310 is provided via a page of a Web browser.

At block 625, other actions, if any, may be performed.

Turning to FIG. 7, at block 705, the actions begin. At block 710, a query is sent. For example, referring to FIGS. 2 and 4, the query "v:latest installcount:100K JS2001" is sent from a user interface 300 of a client to the inspection/search manager 211.

At block 715, results are received. For example, referring to FIGS. 2 and 4, the results shown in pane 310 are received and displayed in the user interface 300 of the client.

At block 720, other actions, if any, may be performed.

As can be seen from the foregoing detailed description, aspects have been described related to searching. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving a software package;
   extracting code from the software package;
   generating analysis data by executing at least a portion of the code and performing dynamic analysis of runtime behavior;
   indexing the code and the analysis data to create or update a data structure that associates searchable terms obtained from the code and from the analysis data with locations of the searchable terms in the code and in the analysis data;
   receiving a query that includes a search term;
   using the data structure to determine a result set that includes an indication of an element of the code that is associated with the search term and at least a portion of the analysis data that is associated with the search term; and
   providing the result set in response to the query.

2. The method of claim 1, further comprising:
   extracting metadata and resources from the software package; and
   indexing the metadata and the resources to create or update the data structure.

3. The method of claim 2, wherein the data structure associates searchable terms obtained from the metadata and from the resources with locations of the searchable terms in the metadata and in the resources.

4. The method of claim 1, further comprising:
   receiving additional metadata that is not included in the software package; and
   indexing the additional metadata to create or update the data structure.

5. The method of claim 1, further comprising:
   receiving an annotation regarding the element of the software package; and
   indexing the annotation to update the data structure.

6. The method of claim 1, wherein generating analysis data further comprises performing static analysis on the code, before executing the code.

7. The method of claim 1, wherein the analysis data comprises code coverage data and runtime tracing data.

8. The method of claim 1, wherein the data structure comprises an inverted word index.

9. The method of claim 1, wherein:
   the query includes a plurality of search terms, and
   the result set is limited based on the plurality of search terms.

10. The method of claim 1, further comprising:
    retrieving a plurality of other software packages;
    extracting code, metadata, and resources from the other software packages;
    generating additional analysis data for the other software packages;
    updating the data structure to associate searchable terms found in the code, metadata, and resources of the other software packages and in the additional analysis data with locations of the searchable terms in the code, metadata, and resources of the other software packages and in the additional analysis data; and
    including, in the result set, an indication of one or more of the other software packages that satisfy the query and at least a portion of the additional analysis data that satisfies the query.

11. The method of claim 1, further comprising:
    using the data structure to maintain index data for multiple versions of the software package.

12. In a computing environment, a system, comprising:
    a memory structured to store elements of a software package and analysis data related to the software package;
    one or more processors coupled to the memory, the one or more processors structured to execute components, the components comprising:
      a transformer structured to extract code from the software package and to store the code on a computer storage device;
      an analysis manager structured to generate the analysis data by executing at least a portion of the code and performing dynamic analysis of runtime behavior;
      an indexer structured to index the code and the analysis data to create or update a data structure that associates searchable terms obtained from the code and from the analysis data with locations of the searchable terms in the code and in the analysis data; and
      a search manager structured to receive a query that includes a search term and to use the data structure to determine a result set that includes an indication of an element of the code that is associated with the search term and at least a portion of the analysis data that is associated with the search term.

13. The system of claim 12, wherein:
    the transformer is further structured to extract metadata and resources from the software package, and
    the indexer is further structured to index the metadata and the resources to update the data structure.

14. The system of claim 13, wherein the transformer is further structured to decompile compiled portions of the software package to create the code.

15. The system of claim 12, wherein the components further comprise:
    an acquisition manager structured to obtain the software package and other software packages from an application source, the acquisition manager configurable as to a frequency at which the acquisition manager obtains the software package and the other software packages from the application source.

16. The system of claim 12, wherein the components further comprise:
    a notification manager structured to send a message to notify a consumer that new updates that satisfy a query have been published.

17. The system of claim 12, wherein the components further comprise:
    an annotation manager structured to receive comments regarding the software package and to provide the comments to the indexer for updating the data structure based on the comments.

18. The system of claim 12, wherein the components are distributed over a plurality of computers.

19. The system of claim 12, wherein at least two of the components are hosted in one or more virtual machines.

20. A computer storage medium storing computer-executable instructions that, when executed, cause a computer system to perform actions comprising:
    extracting code and metadata from a software package;
    generating static analysis data from the code;
    executing the code to generate dynamic analysis data;
    indexing the code, the metadata, the static analysis data, and the dynamic analysis data to create a data structure that associates searchable terms obtained from the code, the metadata, the static analysis data, and the dynamic analysis data with location information that indicates where the searchable terms were obtained; and
    providing a result set that satisfies a query by using the data structure to identify elements in the code, the metadata, the static analysis data, and the dynamic analysis data that are associated with the query.

* * * * *